April 11, 1967  G. VON ROHR  3,313,110
INSTALLATION FOR THE DOUBLE CONTROL OF
THE PEDALS IN MOTOR VEHICLES
Filed Sept. 3, 1964  3 Sheets-Sheet 1

INVENTOR.
Guido Von Rohr
BY
Kurt Kelman
agent 3,313,110
INSTALLATION FOR THE DOUBLE CONTROL OF
THE PEDALS IN MOTOR VEHICLES
Guido von Rohr, Castione, Bellinzona, Ticino, Switzerland, assignor to Indutecnica S.A., Castione, Ticino, Switzerland
Filed Sept. 3, 1964, Ser. No. 394,144
Claims priority, application Switzerland, Sept. 6, 1963, 11,083/63
4 Claims. (Cl. 60—54.5)

The present invention relates to an installation to be placed in a motor vehicle to allow for the double control of the main pedals normally operated by a driver, namely of the clutch pedal, of the foot brake pedal and of the accelerator pedal, and thus to facilitate the task of instructors who are thereby in a position to immediately correct any erroneous moves of driving learners. The installation of the invention comprises a closed hydraulic circuit connecting each main pedal (actuated by the driver) to a corresponding auxiliary pedal (actuated by the instructor sitting beside the driver). Each hydraulic circuit connects a chamber of a main hydraulic cylinder connected to the main pedal with a chamber of an auxiliary hydraulic cylinder connected to the corresponding auxiliary pedal which is mounted for pivoting movement of a base plate preferably disposed on the floor of the vehicle. The hydraulic circuit is completely closed, i.e., it does not include any reserve chamber for the hydraulic liquid in the circuit and, the main cylinders have valves for bleeding air from the main cylinder chamber during the time the hydraulic liquid is charged into this chamber. The main and the auxiliary cylinders each carries a piston slidable therein, which divides the cylinder into two chambers, and a piston rod is associated with each piston. A universal joint preferably connects the piston rod of the main cylinder with clamping means attaching the piston rod to the main pedal. This pedal is carried by a pedal shank and the clamping means comprises a clamp clasping the pedal shank. A compression spring is mounted in one of the main cylinder chambers about its piston rod and ensures the automatic return stroke of its piston, overcoming the hydraulic pressure when the auxiliary pedal is released and the main pedal is depressed. Where there are more than one pedal and associated cylinder, all the auxiliary pedals and cylinders are mounted on a common base plate. Preferably, each auxiliary pedal is carried by a pedal shank having a first portion connected to the auxiliary pedal and a second portion extending substantially perpendicularly from the first shank portion, and the piston rod of the auxiliary cylinder is pivotally linked to the pedal shank at the joint of the shank portions. The installation as a whole is adapted to control all the pedals of the motor vehicle, i.e., the clutch pedal, the foot brake pedal and the accelerator pedal.

The invention will be most readily understood by reference to the accompanying drawings illustrating a preferred embodiment of the installation according to the invention which, for the sake of clarity, has been limited to the clutch pedal and the foot brake pedal only.

The two main cylinders 1–2 (FIGS. 1–4) controlling the main clutch pedal 3 and the foot-brake pedal 4 are connected to the two auxiliary cylinders 7–8 controlling the auxiliary pedals 9–10 by the flexible hydraulic conduits 5–6.

The main cylinders 1–2 (FIG. 4) are connected to each other by means of the sleeve portion 11 which has the rod 12 attached thereto which carries the V-shaped supports 13–14.

Figure 1:
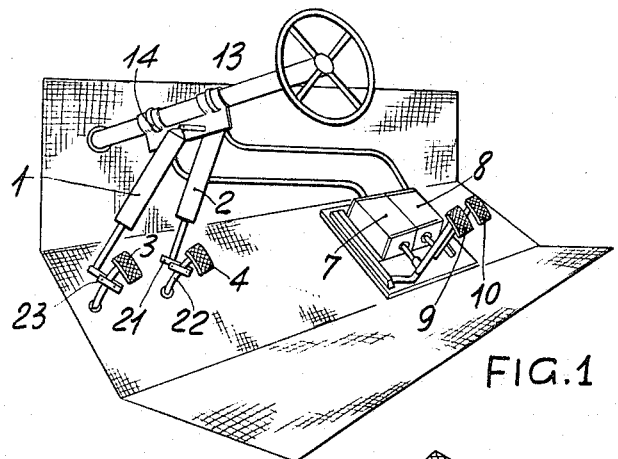
FIG. 1 is a perspective view of the entire installation in the driving compartment of a motor vehicle.
Figure 3:
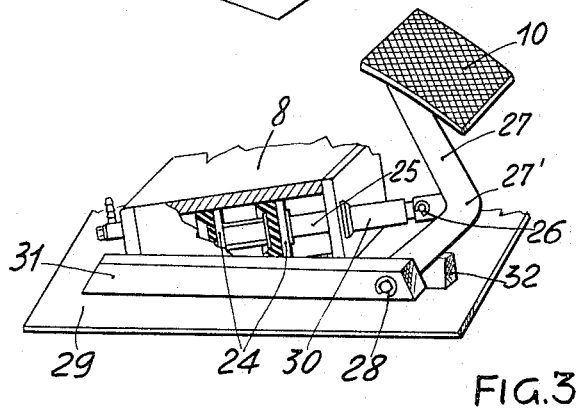
FIG. 3 is a side view partly in section, of an auxiliary cylinder-piston unit connected to the corresponding petal.
Figure 2:
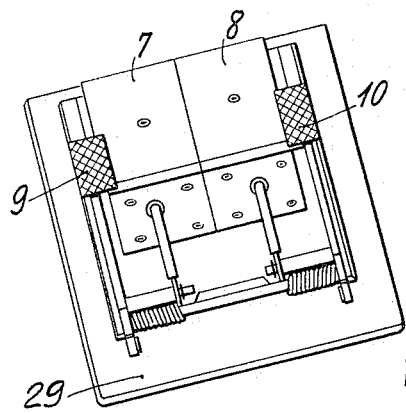
FIG. 2 is a top view of the auxiliary pedals and cylinders.
Figure 4:
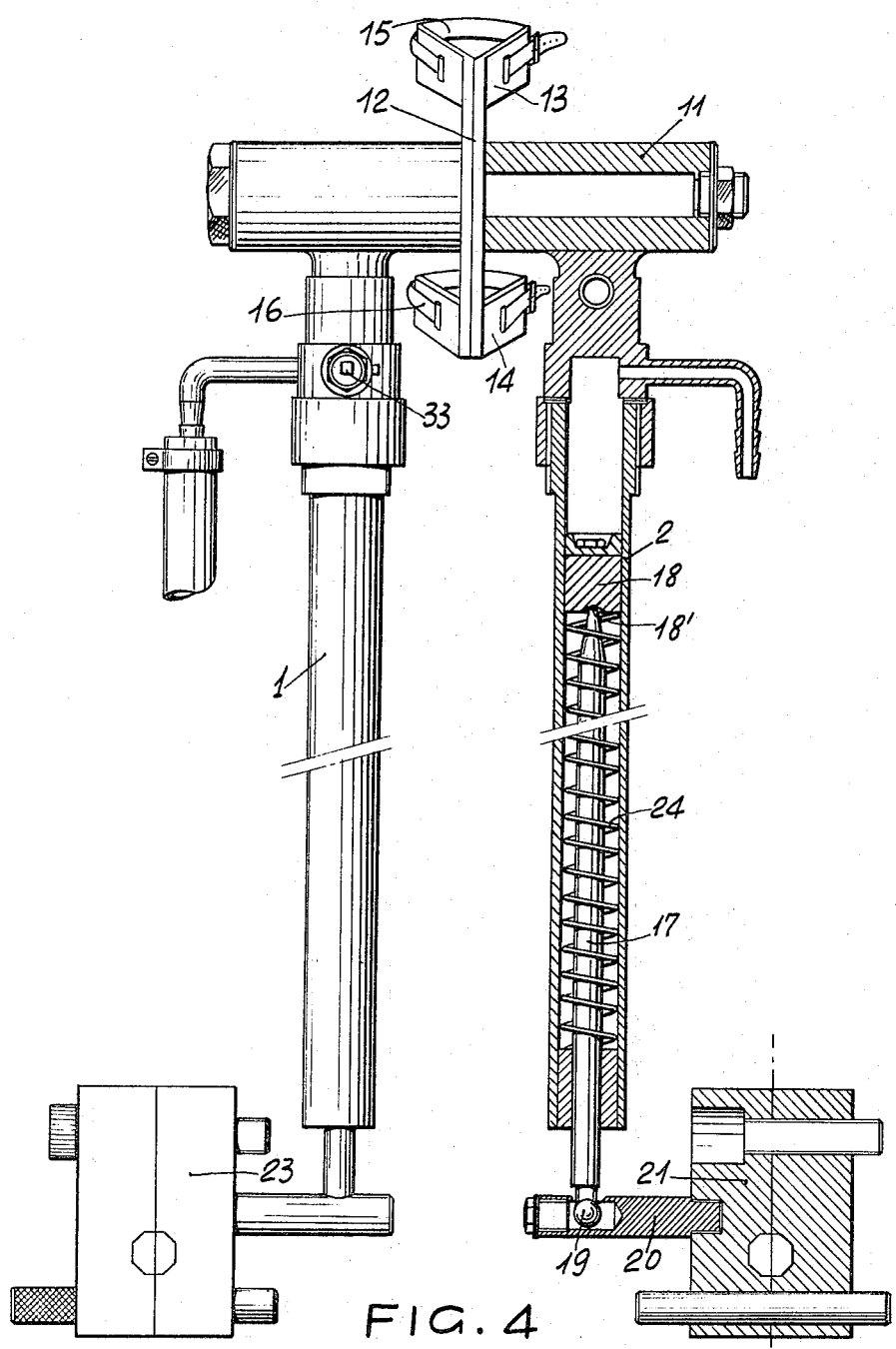
FIG. 4 is a side view, partly in longitudinal section, of the main cylinders controlling the two main pedals.

Straps 15–16 attach the installation of the invention to the steering column 32 (FIG. 1).

Rod 17 of the piston 18 sliding within the main cylinder 2 (FIG. 4) is not rigidly fixed to the piston but is associated therewith by a pointed end engaging a recessed seat 18' in the piston.

The lower end of piston rod 17 is connected by means of the universal joint 19 to connecting piece 20 which is attached to the clamp 21 clasping shank 22 (FIG. 1) of the corresponding main pedal 4. The clamp 23 similarly connects the main cylinder 1 to the main pedal 3.

The spring 24 provides for the return stroke of the piston 18 upwards overcoming the pressure of the hydraulic liquid when the auxiliary pedal 10 is released while the main pedal 4 is depressed.

Figure 5:
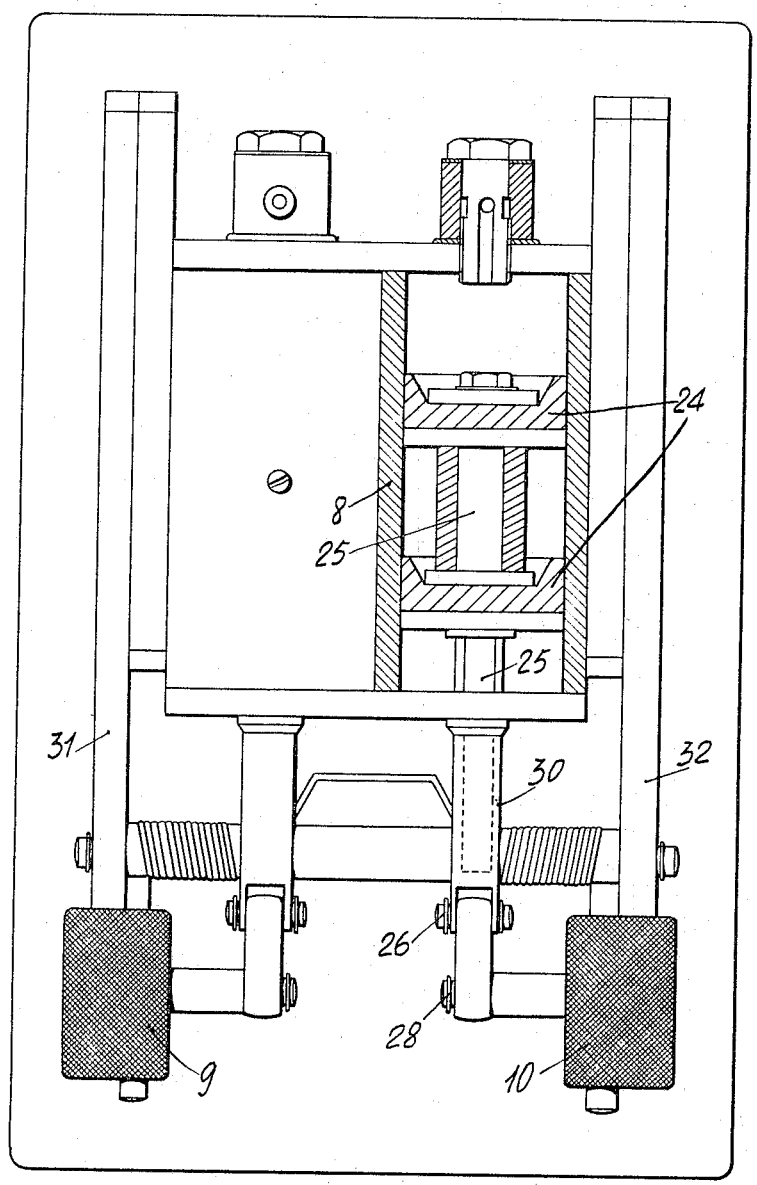
FIG. 5 is a top view, partly in section, of the auxiliary cylinder controlling the auxiliary pedals.

Auxiliary cylinders 7–8 have each a piston 24 (FIG. 5) moving therein with its piston rod 25 sliding within the guide sleeve 30 which is pivoted at 26 to the joint 27' of the mutually perpendicular portions of the pedal shank 27 of the auxiliary pedal 10.

In its turn, the shank 27 is pivoted at 28 to the support plate 29 which is simply placed on the vehicle floor at the side of the instructor or of any other person sitting beside the driver.

The pivot 28 which is common to all the auxiliary pedals is carried by the supports 31, 32. As clearly represented, the whole installation is realized in an extremely simple manner and may be easily manufactured in a mass production system.

A very important characteristic of the invention is the completely closed hydraulic circuit having no reserve chamber for the liquid. Air escape valves 33 (FIG. 4) are provided for bleeding the air when the hydraulic liquid enters the main cylinder chamber of the circuit.

The installation of the invention operates as follows: When the instructor, noticing an erroneous move of the driver, presses e.g. on the foot brake pedal 10 (FIG. 3) the piston 24 compresses the fluid within the conduit 6 and acts therethrough on the main piston 18 (FIG. 4) thereby lowering the main pedal 4.

When the instructor releases the pedal the piston 18, by virtue of the extension of the spring 24, returns upwards in its initial position even if the pedal 4 is still kept down.

The same thing occurs when the other auxiliary pedals or the non represented accelerator pedal are acted upon.

The number of the controlled pedals may be chosen at will and to any desired purpose.

The body of the main and of the auxiliary cylinders is preferably made of light metal, for instance of an aluminum alloy.

The base plate 29, which is also manufactured of a light metal, has preferably a rubber layer disposed underneath to prevent sliding thereof on the floor.

With regard to the main cylinders (FIG. 4), it should be noted that, being fixed underneath the main pedals, the clamps 21–23 are no obstacle at all to the foot acting on the pedals.

The universal joint 19 (FIG. 4) makes it possible to fix the clamp 21 to the pedal shank in the most suitable position.

Thus, it is apparent that the pedal 4 constitutes a main pedal means having a normal position of rest while the pedal 10 constitutes an auxiliary pedal means also having a normal position of rest. The piston 24 is a driving piston operatively connected to the auxiliary pedal means 10 to be actuated thereby while the piston 18 is a driven piston, driven by the driving piston 24. These pistons are respectively slidable in cylinders which are respectively interconnected by the flexible conduit means 6 which constitutes with the cylinders a closed hydraulic circuit filled with hydraulic liquid, the bleed valve means 33 serving to maintain the circuit filled with liquid so that, when the auxiliary pedal means 10 is displaced from its normal position of rest, it will act through the driving piston 24 and the hydraulic liquid on the driven piston 18 to displace the latter. The spring 24 constitutes a spring means acting on the driven piston 18 to urge the latter toward an initial position where the liquid between the pistons 18 and 24 will locate the latter at a location which situates the auxiliary pedal means 10 in its normal position of rest, so that the pedal means 10 is actuated in opposition to the spring means 24 which acts automatically through the pistons and liquid therebetween to return the pedal means 10 to its normal position of rest. The rod 17 together with the clamp assembly 20, 21 constitutes a motion transmitting means which has only an abutting engagement with the driven piston 18 and which is operatively connected with the main pedal means 4 in order to transmit movement of the driven piston 18 to the main pedal means 4 so as to control the vehicle through the latter. At the same time, when the main pedal means 4 is actuated, it will displace the motion transmitting means 17, 20, 21 away from the driven piston 18 so that, under these circumstances, the auxiliary pedal means 10 is not actuated. When the main pedal means 4 returns to its normal position of rest, the motion transmitting means 17, 20, 21 returns to the position where the rod 17 thereof abuts at one end against the driven piston 18.

The shape of the different installation components may be obviously varied without departing from the spirit and scope of the present invention defined by the appended claims.

What is claimed is:

1. In a motor vehicle, main pedal means having a normal position of rest and auxiliary pedal means also having a normal position of rest, a driving piston operatively connected to said auxiliary pedal means to be actuated thereby, a driven piston, a pair of cylinders in which said pistons are respectively slidable, and conduit means extending between and communicating with said cylinders and forming therewith a closed hydraulic circuit between said pistons, a hydraulic liquid filling said circuit, so that said driven piston moves in response to movement of said driving piston, spring means acting on said driven piston for urging the latter to an initial position where said driven piston through said liquid situates said driving piston at a location which situates said auxiliary pedal means at said normal position of rest thereof, so that said auxiliary pedal means is actuated in opposition to said spring means to displace said pistons while said spring means will act through said driven piston during return of the latter to said initial position to displace the liquid in said closed circuit and said driving piston back to said location where said auxiliary pedal means is again in its normal position of rest, and motion transmitting means having only an abutting engagement with said driven piston and connected to said main pedal means for transmitting movement of said driven piston to said main pedal means so that, when said main pedal means is actuated, it will displace only said motion transmitting means while said auxiliary pedal means remains in its normal position of rest whereas, when said auxiliary pedal means is actuated, it will displace said driven piston to act through said motion transmitting means on said main pedal means.

2. The combination of claim 1 and wherein a bleed valve means communicates with said circuit for eliminating air therefrom.

3. The combination of claim 1 and wherein said motion transmitting means includes a rod having one end engaging said driven piston and a clamping assembly clamping said rod to said main pedal means.

4. The combination of claim 1 and wherein said conduit means is flexible.

References Cited by the Examiner
UNITED STATES PATENTS

| | | | |
|---|---|---|---|
| 2,765,055 | 10/1956 | Bloomfield | 60—54.5 X |
| 2,819,627 | 1/1958 | Larson | 74—562.5 |
| 3,075,602 | 1/1963 | Lanzone | 180—77 |
| 3,076,314 | 2/1963 | Stromberg | 60—54.5 |
| 3,174,359 | 3/1965 | Rose | 74—562.5 |

MARTIN P. SCHWADRON, *Primary Examiner.*

ROBERT R. BUNEVICH, *Examiner.*